United States Patent [19]

Itsuji et al.

[11] Patent Number: 5,537,871
[45] Date of Patent: Jul. 23, 1996

[54] HOT WIRE TYPE AIR FLOWMETER

[75] Inventors: Takayuki Itsuji; Masuo Akamatsu; Hiroshi Yoneda, all of Hitachinaka, Japan

[73] Assignees: Hitachi, Ltd., Tokyo; Hitachi Automotive Engineering Co., Ltd., Ibaraki, both of Japan

[21] Appl. No.: 354,036

[22] Filed: Dec. 6, 1994

[30] Foreign Application Priority Data

Dec. 7, 1993 [JP] Japan ..................................... 5-306216

[51] Int. Cl.$^6$ ..................................................... G01F 1/68
[52] U.S. Cl. ..................................... 73/204.17; 73/204.15
[58] Field of Search ........................... 73/204.15, 204.16, 73/204.18, 204.22, 204.27, 204.23

[56] References Cited

U.S. PATENT DOCUMENTS 4,400,974  8/1983  Nishimura et al. .................. 73/204.15
4,682,496  7/1987  Miura et al. .......................... 73/204.23

Primary Examiner—Richard Chilcot
Assistant Examiner—Harshad Patel
Attorney, Agent, or Firm—Antonelli, Terry, Stout & Kraus

[57] ABSTRACT

A hot wire type air flowmeter has a drive circuit for controlling the temperature of a hot wire type resistor and for outputting indications of controlling states as electric signals, an output adjusting circuit for adjusting the electric signals output from the drive circuit, and a subtracter provided in the output adjusting circuit of the hot wire type air flowmeter. The electric signals output from a non-inverting amplifier in the drive circuit are input to one input terminal of the subtracter and a standard voltage supplied via a voltage follower are input to the other input terminal of the subtracter.

10 Claims, 9 Drawing Sheets

HOT WIRE TYPE AIR FLOWMETER

BACKGROUND OF THE INVENTION

The present invention relates to an air flowmeter, particularly to a hot wire type air flowmeter such as used in the control of a vehicle engine.

In a conventional flowmeter, as described by Japanese Patent Application Laid-Open 184923/1982, the output range of an air flowmeter is set by adjusting resistors connected to the current detecting terminal of a hot wire and the zero point is adjusted by changing the standard input voltage of a differential amplifier.

However it is difficult when using conventional techniques to adjust the output of a flowmeter, since the zero adjustment of the air flowmeter output also changes the output range due to temperature differences in all hot wire products, and so repeated operations for alternatively adjusting the zero point and the output range are needed to fix the zero point and the output range for each target value. That is, conventional techniques have the problem that zero adjustment and output range adjustment can not be independently performed without mutual interference therebetween. Further, conventional techniques can not produce enough compensation to temperature changes, since the output of an air flowmeter can not be compensated over the whole range of possible flow rates, although the output temperature compensation is possible to one point of the flow rates.

SUMMARY OF THE INVENTION

The present invention has been achieved in consideration of the above-described problems, and has the aim of providing a hot wire type air flowmeter in which it is possible to adjust the zero point and the output range without causing mutual interferences therebetween.

The above-mentioned object is attained by providing a hot wire type air flowmeter having a hot wire type resistor for detecting air flow rates, a thermosensitive type thermometer for detecting the air temperature in the vicinity of the hot wire type resistor, a drive circuit for controlling the temperature of the hot wire type resistor and for outputting an indication of the controlling states as electric signals and an output adjusting circuit for adjusting output signals from the drive circuit, and comprising a subtracter for receiving at one input terminal output signals from an amplifier for amplifying the output electric signals from the drive circuit and for receiving at the other input terminal theorof an output signal from a means for holding a constant standard voltage.

The above-mentioned object is also attained by providing a hot wire type air flowmeter having a hot wire type resistor for detecting air flow rates, a thermosensitive type thermometer for detecting the temperature around the hot wire type resistor, a drive circuit for controlling the temperature of the hot wire type resistor and for outputting an indication of the controlling states as electric signals, and an output adjusting circuit for adjusting the output electric signals from the drive circuit, and comprising a subtracter for receiving at one input terminal thereof the output electric signals from the drive circuit and for receiving at the other input terminal thereof an output signal from a means for holding a constant standard voltage.

The above-mentioned object is further achieved by providing a hot wire type air flowmeter having a hot wire type resistor for detecting air flow rates, a thermosensitive type thermometer for detecting the air temperature in the vicinity of the hot wire type resistor, a drive circuit for controlling the temperature of the hot wire type resistor and for outputting an indication of the controlling states as electric signals and an output adjusting circuit for adjusting the output electric signals from the drive circuit, and comprising a subtracter for receiving at one input terminal thereof output signals from an amplifier for amplifying the output electric signals from the drive circuit and for receiving at the other input terminal thereof an output signal from a means for holding a constant standard voltage, and the amplifier further including two resistors of different temperature coefficients connected between an output terminal and an input terminal of the amplifier.

The current flowing in the hot wire type resistor is converted to a voltage signal by a standard resistor. The output range of the voltage signal is adjusted so as to take the preset gradient using a non-inverting amplifier. A constant voltage signal from a standard voltage source is subtracted from the adjusted voltage in the subtracter operating as a voltage follower so as to set the zero point to the preset voltage. By the above-mentioned method, the adjustments of the zero point and the output range can be independently performed, respectively.

DETAILED DESCRIPTION OF THE EMBODIMENTS

Figure 1:
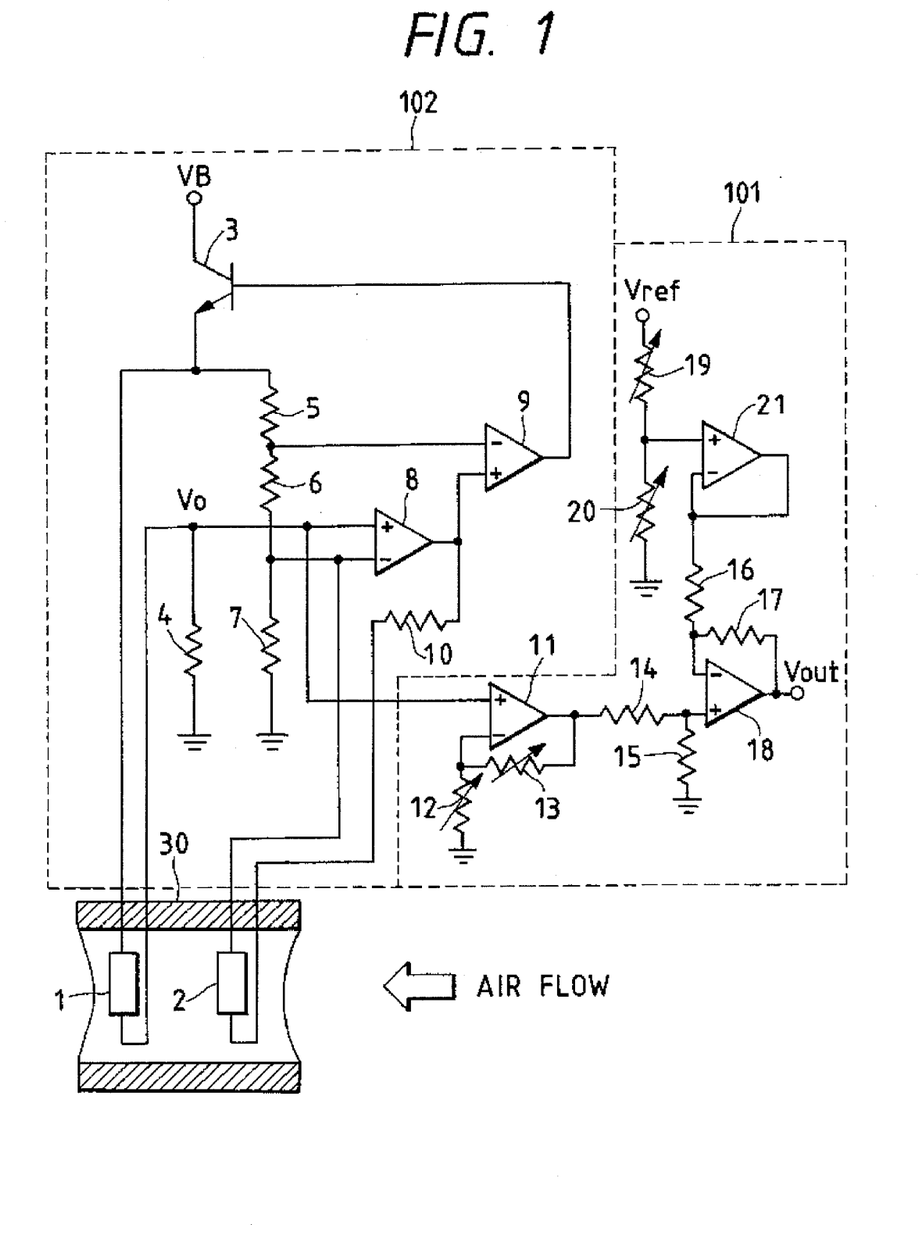
FIG. 1 is a schematic circuit diagram of an embodiment of the present invention.
Figure 2:
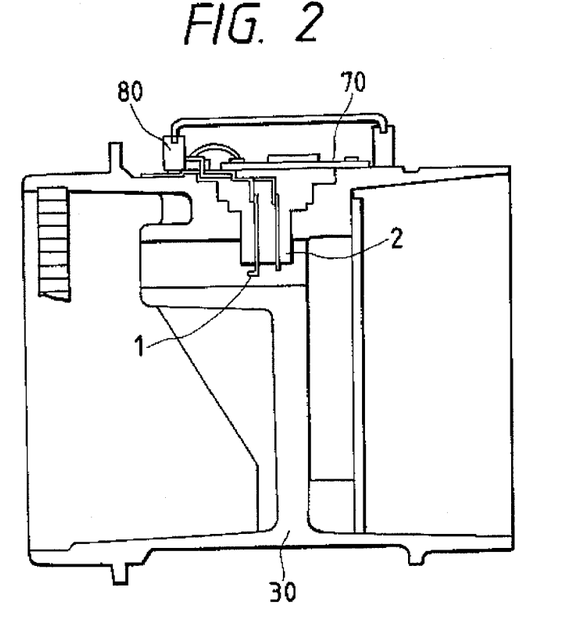
FIG. 2 is a sectional view of an air flowmeter incorporating an embodiment of the present invention.

Hereinafter, details of the present invention will be explained with reference to various embodiments illustrated in the drawings. FIG. 1 is a drawing showing an embodiment of the present invention and FIG. 2 is a sectional view of an air flowmeter according to the present invention. Referring to FIGS. 1 and 2, the fundamental operations and constitution of present invention will be explained. A hot wire type resistor 1 and a thermistor type thermometer 2 are provided in an air flow path 30. A standard resistor 4 converts the current flowing in the hot wire type resistor 1 to a voltage signal and forms a bridge circuit together with resistors 5, 6 and 7. The bridge circuit controls a transistor 3 via differential amplifiers 8 and 9 by using the hot wire type resistor 1 and the thermistor type resistor 2 so that the hot wire resistor 1 type is maintained at a predetermined temperature corresponding to the air flow rate Q and the air temperature. Therefore, the current Ih flowing in the standard resistor 4 changes in accordance with air flow rate Q as shown by Eq. 1 when the temperature of the hot wire type resistor 1 is controlled to be constant. That is, the terminal voltage Vo of the standard resistor 4 changes in accordance with the air flow rate Q as shown by Eq. 2. In this way, the hot wire type resistor 1 is controlled by the drive circuit 102.

$$Ih^2 \cdot Rh = (A + B\sqrt{Q})(Th - Ta) \quad (1)$$

where, Rh: the resistance value of the hot wire type resistor in the heating state, A, B: constants of the hot wire type resistor, Th: the temperature of the hot wire type resistor in the heating state, and Ta: the air temperature.

$$Vo = R4[(A + B\sqrt{Q})(Th - Ta)/Rh]^{1/2} \quad (2)$$

where, R4: the resistance value of the standard resistor 4.

Figure 3:
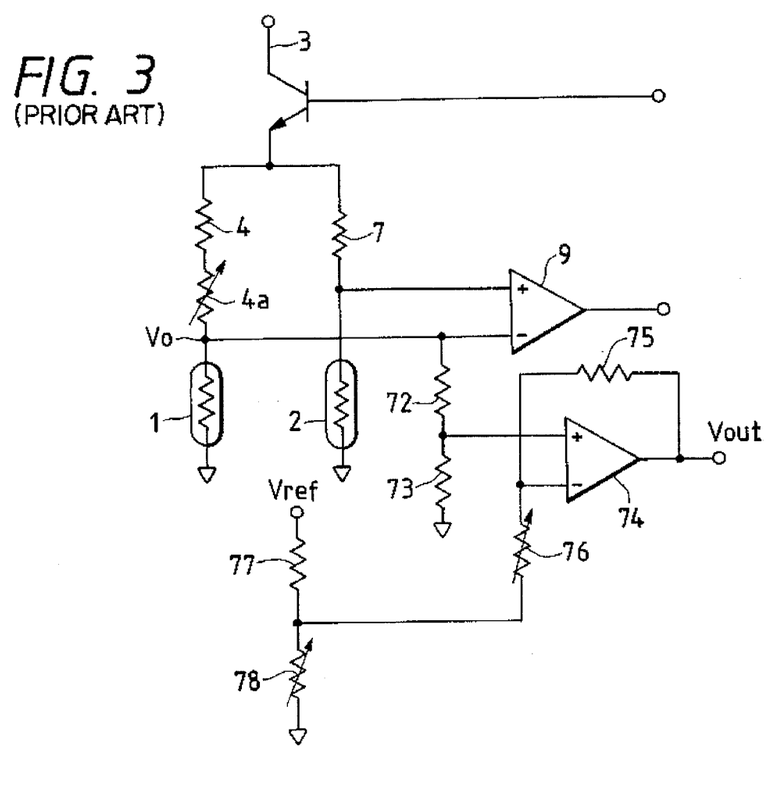
FIG. 3 is a schematic circuit diagram of a conventional air flowmeter.

Individual variation of the terminal voltage Vo is induced by productive variation of the hot wire type resistors. In order to absorb such variations, n output adjusting circuit 101 is provided. FIG. 3 shows a conventional circuit composition for absorbing such variations. In the conventional circuit, a resistor 4a, connected to a resistor 4 for detecting the current flowing in the hot wire type resistor 1, is adjusted so that the output range is set to a predetermined value. By this method, the temperature of the hot wire type resistor 1 can not be kept constant, which makes the temperature characteristics of the flowmeter worse. And, the zero point is adjusted by adjusting a standard voltage input to a differential amplifier 74 by changing the resistance values of resistors 76 and 78. In the circuit shown in FIG. 3, the relation between the terminal voltage Vo and the output voltage Vout is expressed by Eq. 3.

$$Vout = [1 + (R77 + R75) \times R75/(R77 \cdot R75 + R75 \cdot R76 + R76 \cdot R77)] \times [R73/(R73 + R72)] \times Vo - [(R78 \cdot R75)/(R77 \cdot R78 + R78 \cdot R76 + R76 \cdot R77)] \times Vref \quad (3)$$

where, Vref: the standard voltage,

R72: the resistance value of resistor 72,

R73: the resistance value of resistor 73,

R74: the resistance value of resistor 74,

R75: the resistance value of resistor 75,

R76: the resistance value of resistor 76,

R77: the resistance value of resistor 77, and

R78: the resistance value of resistor 78.

It turns out from Eq.3 that if the zero point is adjusted by resistors 76 and 78 for the zero adjustment, the output range also changes.

On the other hand, the embodiment of the present invention, as seen in FIG. 1, comprises a noninverting amplifier composed of a differential amplifier 11 and resistors 12 and 13, and a subtracter in the form of a voltage follower, composed of differential amplifier 18, having an output of differential amplifier 11 supplied to the non-inverting input thereof and an output of the amplifier 21 supplied to the inverting input, thereof, and having resistors 14, 15, 16 and 17 connected thereto. Those circuits are formed on a substrate 70 and mounted in a case 80, as seen in FIG. 2. In the embodiment, the relation between the terminal voltage Vo and the output voltage Vout is expressed by Eq.4.

$$Vout = [ (R12+R13)/R12] \times Vo - [R20/(R19+R20)] \times Vref \ldots \quad (4)$$

where, R12: the resistance value of resistor 12,

R13: the resistance value of resistor 13,

R19: the resistance value of resistor 19, and

R20: the resistance value of resistor 20.

Figure 4:
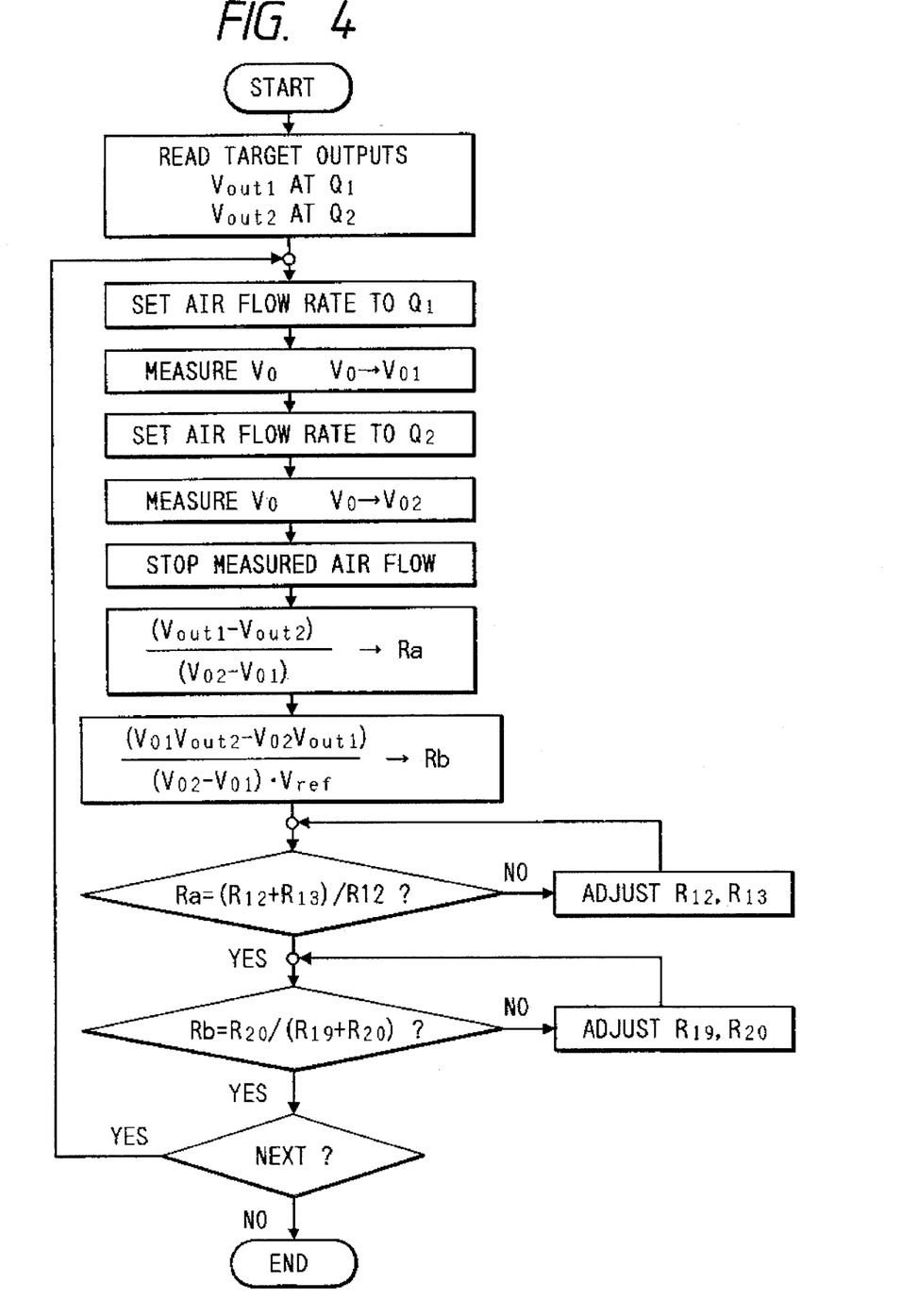
FIG. 4 is a flow chart of an adjustment method according to the present invention.

As proved from Eq. 4, the zero adjustment and the output range adjustment can be carried out independently and without causing mutual interference therebetween. As an adjustment method, a method in which resistors are adjusted so that the output Vout is set to a predetermined value, as air flows and Vout is measured, can be considered. However, this method wastefully consumes energy, since air needs to continuously flow during the adjustment. Thus, a method in which it is not air for necessary to continuously flow during the adjustment will be explained by a flow chart of adjustment procedures as shown by FIG. 4.

At first, the terminal voltage Vo of the standard resistor at an optional flow rate Q1 is measured and the measured output value is expressed as Vo1. Secondly, the terminal voltage Vo of the standard resistor at an optional flow rate Q2 different from Q1 is measured and the measured value is designated as Vo2. Then, if the required output values at the flow rates Q1 and Q2 are set as Vo1 and Vo2, the relations between R12 and R13, and R19 and R20 are expressed by Eqs. 5 and 6, respectively, from Eq. 4.

$$(R12+R13)/R12= (Vout1-Vout2)/(VO2-Vo1) \ldots \quad (5)$$

$$R20/(R19+R20)=(VO1 \cdot Vout2-Vo2 \cdot Vout1)/[ (Vo2-VO1) \times Vref] \quad (6)$$

As proven from Eqs. 5 and 6, both the zero and the output range adjustment can be executed, respectively, without causing mutual interference therebetween by only adjusting resistors R12, R13, R19 and R20 without air continuously flowing since the resistance values to be adjusted can be uniquely obtained by calculations if only the terminal voltages Vo1 and Vo2 at the flow rates Q1 and Q2 are measured.

Figure 5:
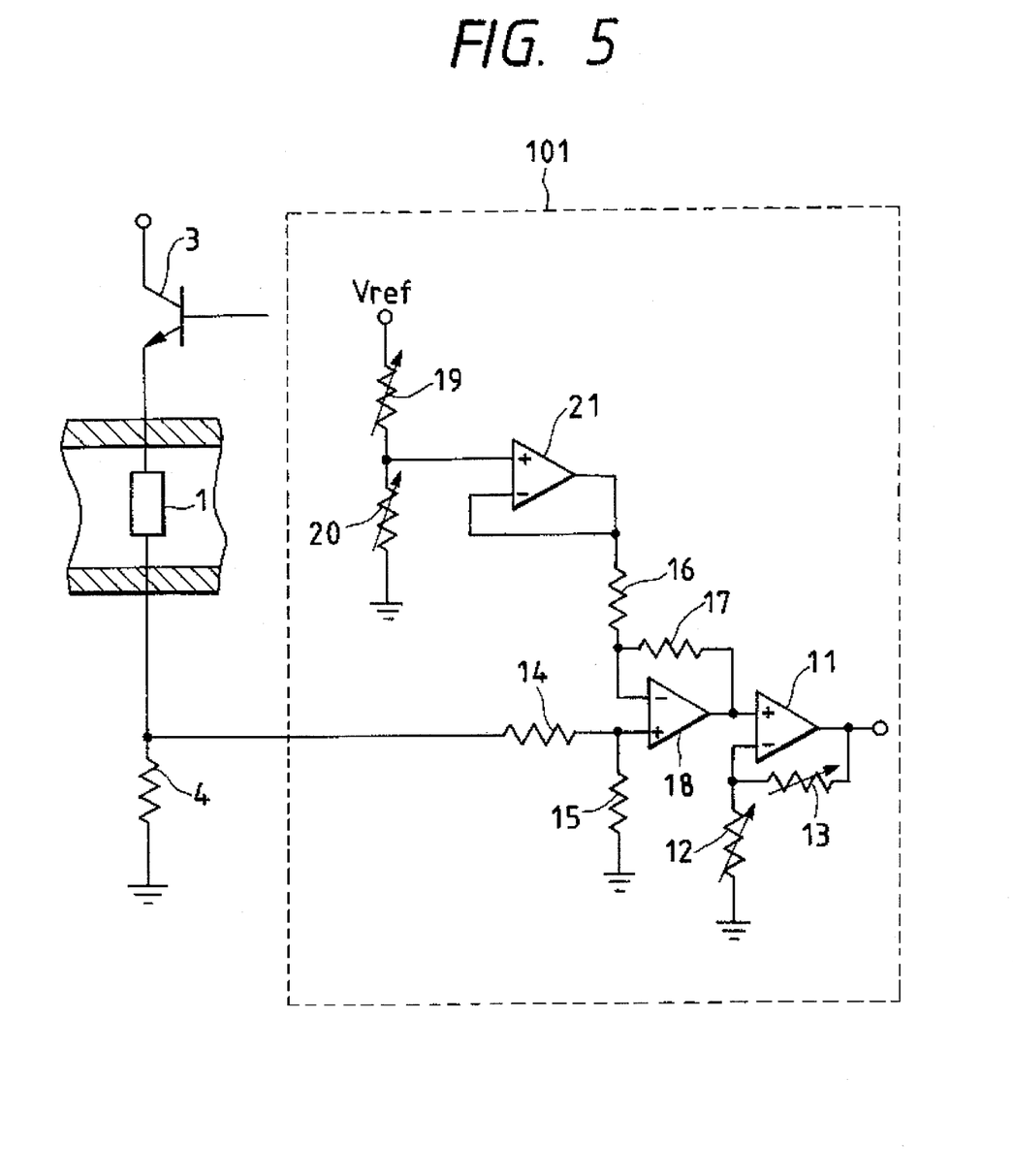
FIG. 5 is a schematic circuit diagram of another embodiment of the present invention.

In FIG. 5, another embodiment having a non-inverting amplifier, a subtracter and a voltage follower is shown. The relation between Vo and Vout in this case is shown below.

$$Vout = [(R12+R13)/R12] \times [Vo-R20/(R19+R20) \times Vref] \ldots \quad (7)$$

As proven from Eq. 7, also in this case, both, the zero and the output range adjustment can be executed, respectively, without causing mutual interferences in adjusting firstly the zero point and secondly the output range.

Figure 6:
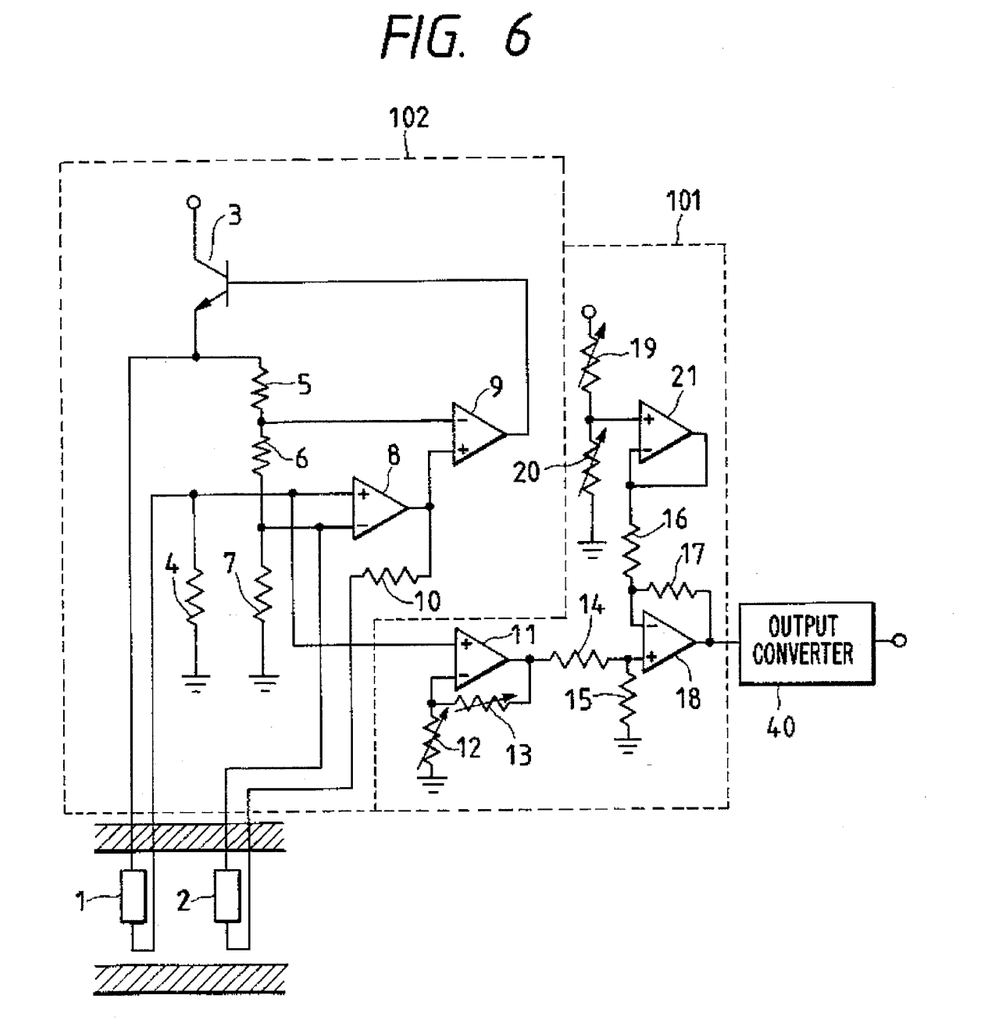
FIG. 6 is a schematic circuit diagram of another embodiment of the present invention.

In the embodiment shown in FIG. 6, the circuits for the zero and the output range adjustment are provided ahead of an output converting circuit. The output converting circuit 40 converts the output voltage to a frequency output or a current output. By this embodiment, the zero point and the output range adjustment can be independently carried out, respectively, along with adjustments for frequency output and current output.

Figure 7:
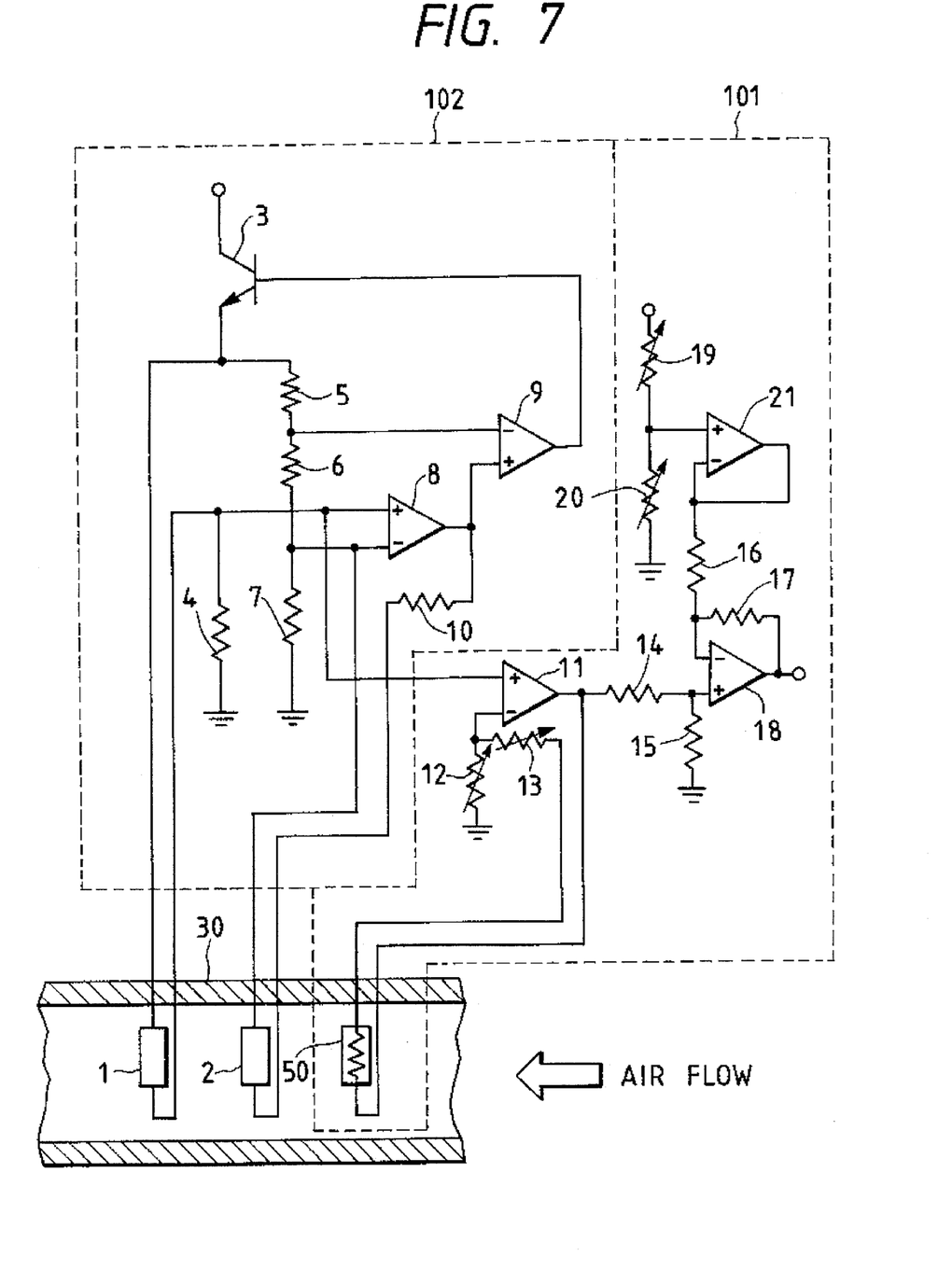
FIG. 7 is a schematic circuit diagram of another embodiment of the present invention.

In the embodiment shown in FIG. 7, a resistor 50 having a temperature coefficient different from the other resistors is provided in a negative feedback loop of the non-inverting amplifier and is installed at a position where it is exposed to the suction air.

Figure 8:
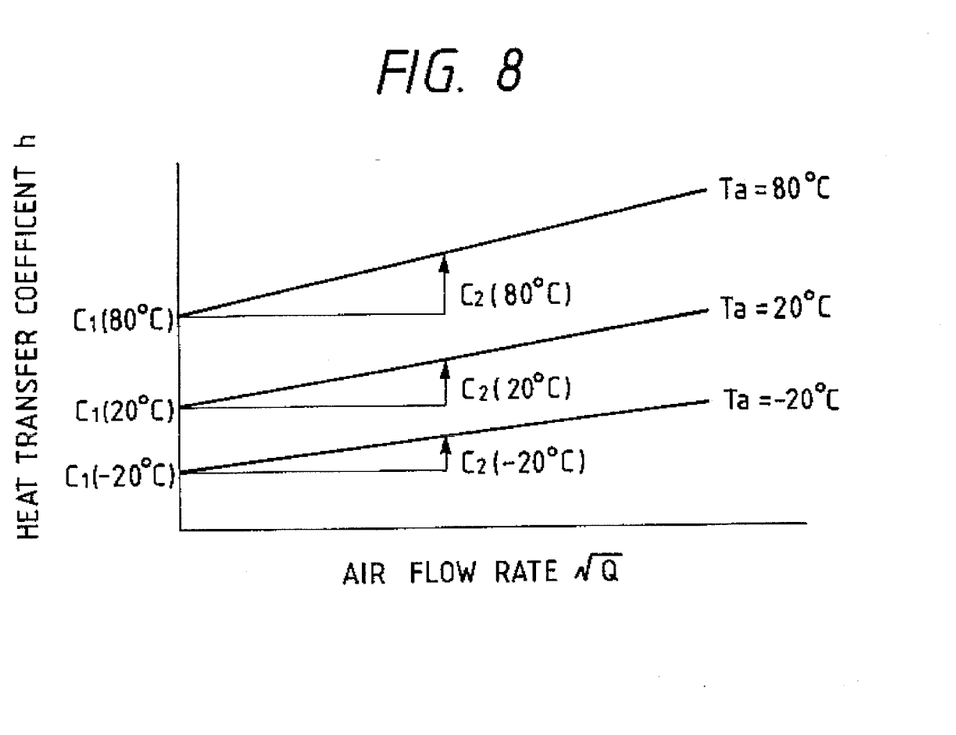
FIG. 8 is a characteristic diagram which shows the relation between the heat transfer coefficient and the air flow rate.

The voltage source circuit for Vref has a temperature dependency for compensating changes in the output voltage Vout caused by changes in suction air temperature at a flow rate Qa, in the conventional circuit for the air flowmeter. However, the amount of change of Vout for the same change of flow rate is not constant through the whole range of possible flow rates. The reason is because the heat transfer coefficient h, as expressed by Eq.8, and the coefficients C1 and C2 of the equation depend on the suction air temperature, as shown by FIG. 8.

$$h = C1 + C2 \sqrt{Q} \qquad (8)$$

where, C1, C2: constants.

Figure 9:
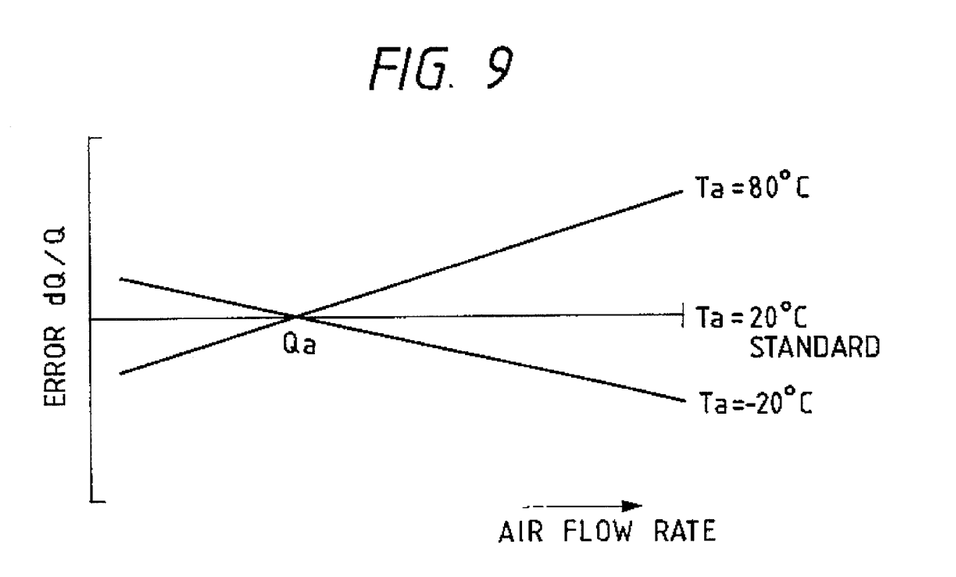
FIG. 9 is a characteristic diagram which shows the relation between the error induced by temperature change and the air flow rate.

Therefore, although a conventional circuit can compensate for a change of the output only at the one point of the flow rate Qa, it can not compensate for an output change through a whole range of flow rate. In particular, the error of output dQ/Q changes as shown in FIG. 9. According to the present invention, the output change induced by the air temperature change is compensated by providing a resistor having a temperature coefficient sufficient to compensate for the heat transfer coefficient change due to the air temperature dependency, besides the flow rate change. The changes of the zero point and the output range can be compensated by combining such a resistor and the conventional circuit.

Figure 10:
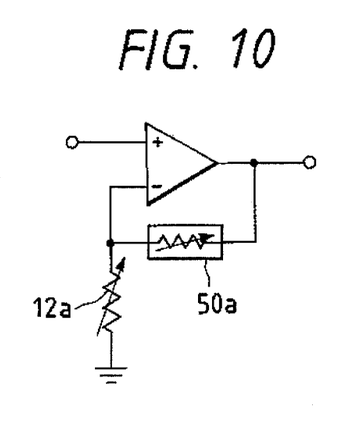
FIG. 10 is a circuit diagram of an amplifier capable of compensating temperature dependency.
Figure 11:
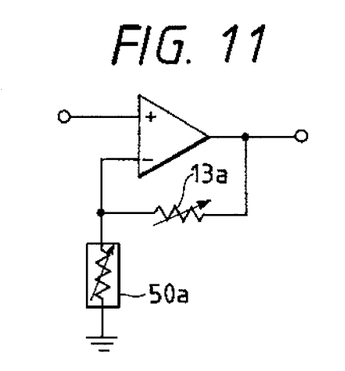
FIG. 11 is a circuit diagram of an amplifier capable of compensating temperature dependency.
Figure 12:
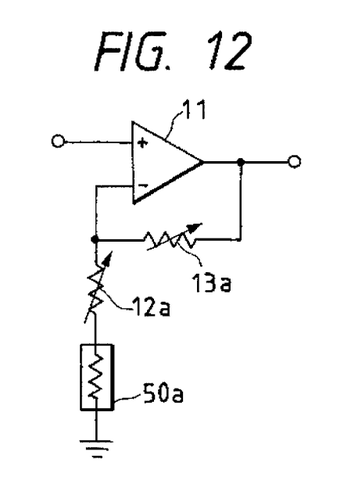
FIG. 12 is a circuit diagram of an amplifier capable of compensating temperature dependency.
Figure 13:
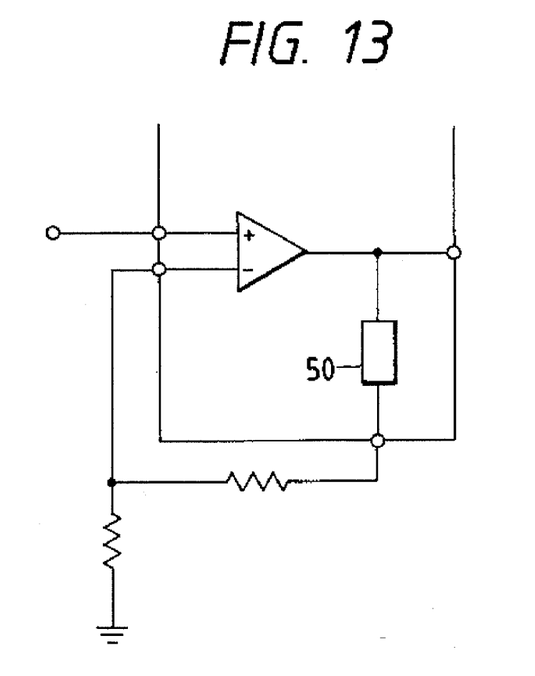
FIG. 13 is a circuit diagram of an amplifier capable of compensating temperature dependency.
Figure 14:
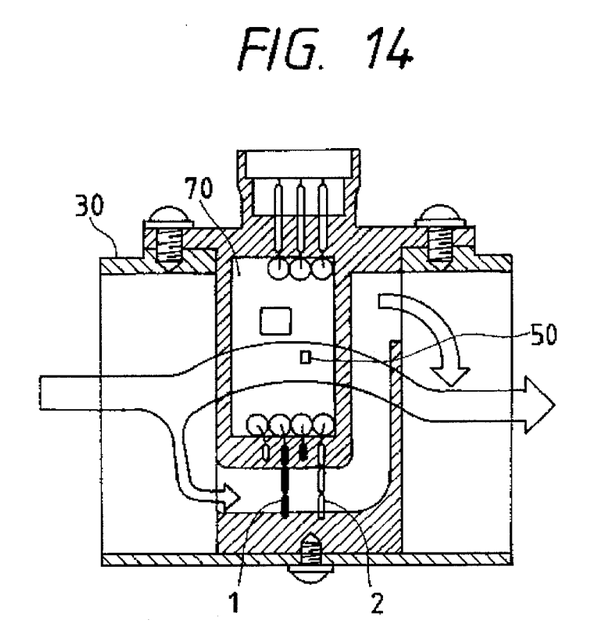
FIG. 14 is a sectional view of an air flowmeter forming another embodiment of the present invention.

The amplifier circuit shown by FIGS. 10 and 11 comprise a variable resistor 50a having a temperature coefficient different from the other variable resistors 12a or 13a, and in the amplifier circuit shown by FIG. 12, a resistor 50a of a fixed resistance value having a temperature coefficient different from the other variable resistors 12a or 13a is provided between the negative input terminal of the differential amplifier 11 and the earth. In the circuit shown by FIG. 13, the resistor 50 having a temperature coefficient different from the other ones is made by a monolithic resistor and formed in an IC. An air flowmeter using this circuit has the worse accuracy, but is cheaper in price. The IC and other elements are protected, and the reliability of an air flowmeter is improved, by adopting a structure or a composition of an air flowmeter wherein a substrate, in which there is provided a resistor having a temperature coefficient different from other ones, or an IC including a resistor having a temperature coefficient different from other ones, is wholly and directly exposed to the suction air flow or installed at such a position that the substrate will reach almost the same temperature as the suction air, as shown by FIG. 14.

By the present invention, the zero point and the output range can be independently adjusted without causing mutual interference therebetween and the air flow rate can be detected with a high accuracy.

What is claimed is:

1. A hot wire flowmeter comprising a hot wire resistor connected to a current source and disposed in an air flow for producing an output voltage indicative of air flow rate; a thermistor for detecting ambient air temperature in the vicinity of said hot wire resistor; a drive circuit responsive to the output voltage of said hot wire resistor and to an output of said thermister for controlling the temperature of said hot wire resistor and for outputting indications of air flow rates as electric signals; and an output adjusting circuit for adjusting said electric signals output from said drive circuit, including an amplifier for amplifying said electric signals output from said drive circuit, means for providing a constant standard voltage, and a subtracter having first and second input terminals, wherein said first input terminal receives output signals from said amplifier for amplifying said electric signals output from said drive circuit and said second input terminal receives an output signal from said means for providing a constant standard voltage.

2. A hot wire air flowmeter according to claim 1, wherein said means for providing a constant standard voltage includes a standard voltage source coupled to a differential amplifier whose output is supplied to an inverting input terminal of a further differential amplifier operating as said subtracter.

3. A hot wire air flowmeter according to claim 1, wherein said amplifier for amplifying said electric signals is a non-inverting amplifier.

4. A hot wire air flowmeter comprising: a hot wire resistor connected to a current source and disposed in an air flow for producing an output voltage indicative of air flow rate, a thermistor disposed in said ambient air flow for detecting air temperature in the vicinity of said hot wire resistor, a drive circuit responsive to the output voltage of said hot wire resistor and to an output of said thermister for controlling the temperature of said hot wire resistor and for outputting an electric signal indicative of air flow rate, and an output adjusting circuit for adjusting said electric signal output from said drive circuit, said output adjusting circuit including means for providing a constant standard voltage, and a subtracter having first and second input terminals, wherein said first input terminal receives said electric signal output from said drive circuit and said second input terminal receives an output signal from said means for providing a constant standard voltage.

5. A hot wire air flowmeter according to claim 4, wherein said subtracter includes a differential amplifier operating as a voltage follower.

6. A hot wire air flowmeter according to claim 5, wherein said means for providing a constant standard voltage includes a standard voltage source coupled to a differential amplifier whose output is supplied to an input terminal of said substracter.

7. A hot wire flowmeter comprising a hot wire resistor connected to a current source and disposed in an air flow for produing an output voltage indicative of air flow rate; a thermistor for detecting ambient air temperature in the vicinity of said hot wire resistor; a drive circuit responsive to the output voltage of said hot wire resistor and to an outut of said thermistor for controlling the temperature of said hot wire resistor and for outputting indications of air flow rates as electric signals; and an output adjusting circuit for adjusting said electric signals output from said drive circuit, including an amplifier for amplifying said electric signals output from said drive circuit, means for providing a constant standard voltage, and a subtracter having first and second input terminals, wherein said first input terminal rerceives output signals from said amplifier and said second input terminal receives an output signal from said means for providing a constant standard voltage, said amplifier including a circuit, having at least two resistors having different temperature coefficients, connected between an output terminal and an input terminal of said amplifier.

8. A hot wire air flowmeter according to claim 7, wherein at least one of said at least two resistors is installed in an air path.

9. A hot wire air flowmeter according to claim 7, wherein said means for providing a constant standard voltage includes a a variable standard voltage source coupled to a differential amplifier whose output is supplied to an inverting input terminal of a further differential amplifier operating as said subtractor.

10. A hot wire type air flowmeter according to claim 7, wherein said amplifier for amplifying said electric signals is a non-inverting amplifier.

* * * * *